US011288151B2

(12) United States Patent
Yakushkin et al.

(10) Patent No.: US 11,288,151 B2
(45) Date of Patent: Mar. 29, 2022

(54) SYSTEM AND METHOD OF DETERMINING BOOT STATUS OF RECOVERY SERVERS

(71) Applicant: Acronis International GmbH, Schaffhausen (CH)

(72) Inventors: Alexey Yakushkin, Moscow (RU); Georgy Gomenyuk, Moscow (RU); Anton Enakiev, Moscow (RU); Sergey Ulasen, Costa del Sol (SG); Stanislav Protasov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 51 days.

(21) Appl. No.: 16/939,115

(22) Filed: Jul. 27, 2020

(65) Prior Publication Data

US 2021/0049083 A1 Feb. 18, 2021

Related U.S. Application Data

(60) Provisional application No. 62/885,934, filed on Aug. 13, 2019.

(51) Int. Cl.
*G06F 11/26* (2006.01)
*H04L 29/06* (2006.01)
*G06N 20/00* (2019.01)
*G06F 11/22* (2006.01)

(52) U.S. Cl.
CPC .......... *G06F 11/26* (2013.01); *G06F 11/2257* (2013.01); *G06N 20/00* (2019.01); *H04L 63/083* (2013.01)

(58) Field of Classification Search
CPC ..... G06F 11/26; G06F 11/2257; G06N 20/00; H04L 63/083
See application file for complete search history.

(56) References Cited

U.S. PATENT DOCUMENTS

| 9,292,671 | B1* | 3/2016 | Robinson | H04L 63/083 |
| 9,529,815 | B1* | 12/2016 | Garg | G06F 16/1734 |
| 2003/0084376 | A1* | 5/2003 | Nash | G06F 11/36 |
| | | | | 714/38.13 |
| 2004/0030932 | A1* | 2/2004 | Juels | H04W 12/126 |
| | | | | 713/151 |

(Continued)

*Primary Examiner* — Gabriel Chu
*Assistant Examiner* — Matthew N Putaraksa
(74) *Attorney, Agent, or Firm* — Arent Fox LLP; Michael Fainberg (57) ABSTRACT

Disclosed herein are systems and method for determining a boot status of a failover server. In an exemplary aspect, a method may receive a failover test request for a failover server that provides disaster recovery for a production server, wherein the failover test request queries a successful boot status of the failover server. The method may determine whether a login into the failover server can be performed to execute the failover test request. In response to determining that the login cannot be performed, the method may retrieve server metrics for a failover server from a metric store and may determine a probability of the successful boot status based on both the retrieved server metrics and historic server metrics. In response to determining that the probability is greater than a threshold probability, the method may mark a recovery point of the failover server as validated.

20 Claims, 6 Drawing Sheets

(56) References Cited

U.S. PATENT DOCUMENTS

| | | | |
|---|---|---|---|
| 2008/0320310 A1* | 12/2008 | Florencio | H04L 63/0428 713/184 |
| 2009/0138713 A1* | 5/2009 | Veillette | H04L 67/2814 713/171 |
| 2012/0185684 A1* | 7/2012 | Lee | G06F 1/263 713/2 |
| 2012/0297468 A1* | 11/2012 | Bharadwaj Subramanya | H04L 69/40 726/7 |
| 2015/0074461 A1* | 3/2015 | Yu | G06F 11/1417 714/36 |
| 2017/0195311 A1* | 7/2017 | Liu | G06F 21/35 |
| 2021/0142415 A1* | 5/2021 | Rayat | G06Q 40/06 |

* cited by examiner

SYSTEM AND METHOD OF DETERMINING BOOT STATUS OF RECOVERY SERVERS

CROSS-REFERENCE TO RELATED APPLICATIONS

This application claims the benefit of U.S. Provisional Application No. 62/885,934, filed Aug. 13, 2019, which is herein incorporated by reference.

FIELD OF TECHNOLOGY

The present disclosure relates generally to the field of failover testing for recovery servers, and more specifically, to systems and method of determining boot status of recovery servers.

BACKGROUND

Production servers provide live services or applications to clients. In some instances, these production servers may fail due to a malware attack, a virus, a power issue, or the like. Systems are often put into place that allow for a "failover" process that switches a customer's production system to a disaster recovery site. In this manner, the customer is not as severely affected and can access some or all of the services/resources that the production server provided. There are two types of known failover operations: production failover and failover tests. Production failover refers to switching all production functions and operations to disaster recovery site, while failover tests keep production systems functioning on a customer's site, but allow an isolated copy of a customer's systems to launch at the disaster recovery site simultaneously as the live system. Failover tests allow customers to make sure the recovery point at the disaster recovery site is valid, and can be successfully used for a production failover when it is needed.

Regular failover tests are commonly a mandatory part of customers' disaster recovery plan. Automated failover tests that are executed without customer involvement, allow customers to preserve manual efforts on failover testing and eliminates the risk of human error. In order to validate automated test failover success and mark a corresponding recovery point as validated, the status of the recovery server booted from a backup recovery point must be determined, where access through login to the recovery server may be available.

Currently, there is no standard (operating system agnostic) and accurate (providing correct results with a high probability) method to check the boot status of the recovery server started remotely, e.g., in the cloud or the like. It is often not possible to log in to the cloud recovery server, as cloud credentials are owned by the customer and not shared with providers of the recovery servers. Customer's production systems can be based on various editions and versions of a single operating system. Furthermore, new versions of operating systems are being continuously released. Therefore a standard way to determine the status of a recovery server is needed. In an exemplary aspect, a method may receive a failover test request for a failover server that provides disaster recovery for a production server, wherein the failover test request queries a successful boot status of the failover server. The method may determine whether a login into the failover server can be performed to execute the failover test request. In response to determining that the login cannot be performed, the method may retrieve server metrics for a failover server from a metric store and determine a probability of the successful boot status based on both the retrieved server metrics and historic server metrics. In response to determining that the probability is greater than a threshold probability, the method may mark a recovery point of the failover server as validated.

SUMMARY

To address these shortcomings, the present disclosure discusses a system and a method for determining the boot status of a recovery server.

In an exemplary aspect, a method may receive a failover test request for a failover server that provides disaster recovery for a production server, wherein the failover test request queries a successful boot status of the failover server. The method may determine whether a login into the failover server can be performed to execute the failover test request. In response to determining that the login cannot be performed, the method may retrieve server metrics for a failover server from a metric store and may determine a probability of the successful boot status based on both the retrieved server metrics and historic server metrics. In response to determining that the probability is greater than a threshold probability, the method may mark a recovery point of the failover server as validated.

In some aspects, in response to determining that the probability is not greater than the threshold probability, the method may mark the recovery point as invalid and raise an alert.

In some aspects, the server metrics are captured in an input data structure. The method may determine the probability by providing the input data structure of the server metrics to a machine learning model configured to apply weights to the input data structure to yield the probability of the successful boot status, wherein the weights are determined by training the machine learning model based on (1) the historic server metrics and (2) an indication of whether the historic server metrics correspond to the successful boot status.

In some aspects, the threshold probability is an upper threshold probability. The method may compare the probability to both the upper threshold probability and a lower threshold probability, wherein probabilities greater than the upper threshold probability are indicative of the successful boot status and probabilities less than the lower threshold probability are indicative of a failure boot status. In response to determining that the probability is not greater than the upper threshold probability and is not less than the lower threshold probability, the method may manually set a server boot status of the failover server, include the retrieved server metrics in the historic server metrics, and re-determine the weights of the machine learning model.

In some aspects, the metrics store storages one or more of cloud server login screen images, cloud server networking activities snapshots, cloud server disk activities snapshots, and cloud server CPU activities snapshots.

In some aspects, the server metrics comprise a unique machine boot state identifier, parameter type, parameter value, and machine boot state.

In some aspects, the method may determine that the login into the failover server cannot be performed to execute the failover test request by determining that the failover server is password-protected with an unknown password.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of determining boot status of recovery servers. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
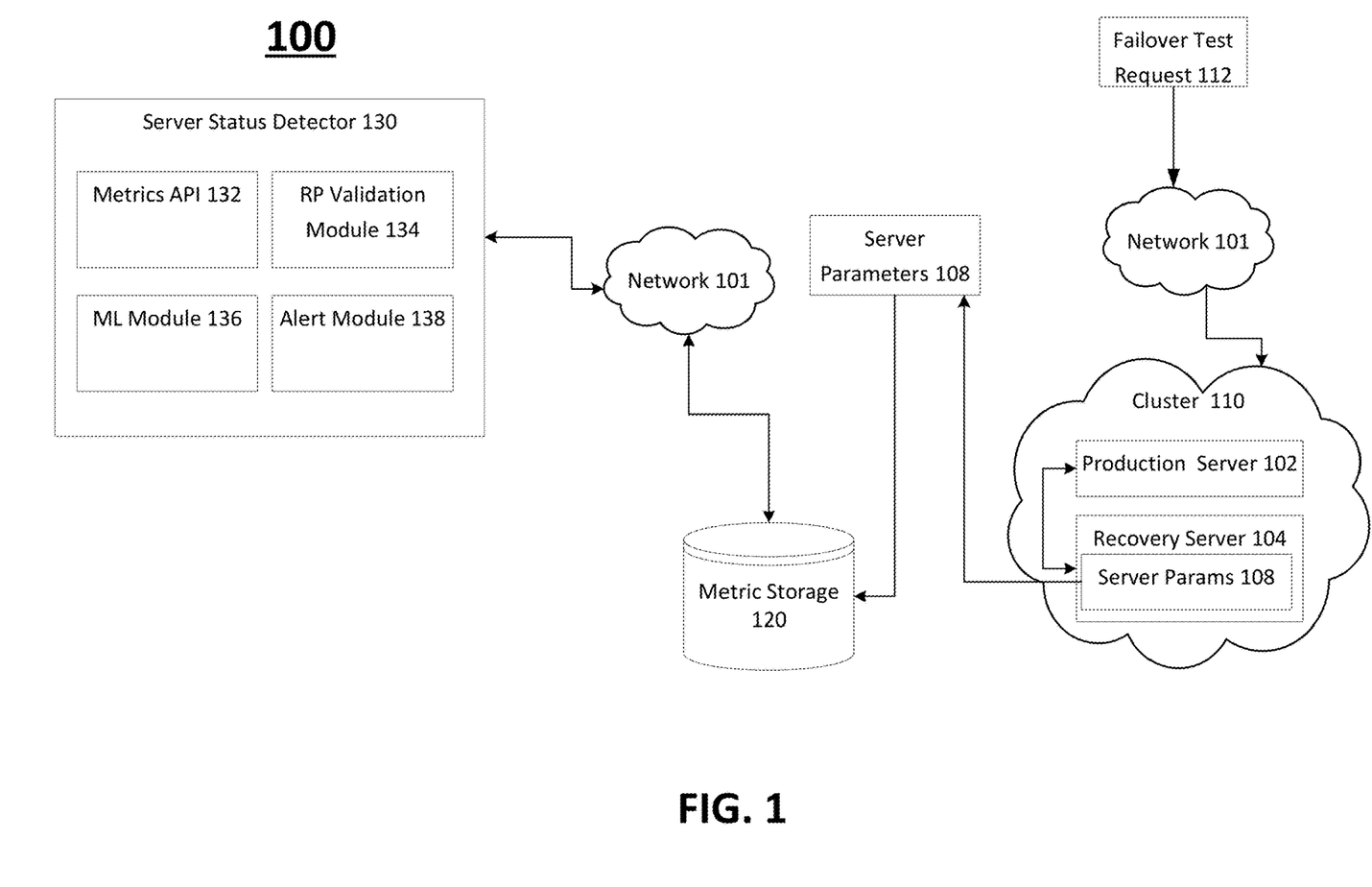
FIG. 1 is a block diagram of a system of determining boot status of recovery servers, in accordance with exemplary aspects of the present disclosure.

FIG. 1 is a block diagram of a system 100 of determining boot status of recovery servers, in accordance with exemplary aspects of the present disclosure.

The system 100 comprises a network 101, a cluster 110, metric storage 120 and server status detector 130. In exemplary aspects the cluster 110 may host a plurality of servers for hosting applications and services such as production server 102 and recovery server 104. In some embodiments, cluster 110 may host a plurality of physical servers, virtual servers, and/or cloud servers. In exemplary aspects, there may be multiple primary production servers such as production server 102 in cluster 110, and multiple recovery servers such as the recovery server 104. Production server 102 and recovery server 104 are both depicted in cluster 110 only for simplicity. One skilled in the art would appreciate that production server 102 may be located in a different cluster from recovery server 104 or may be an isolated server. In the case that the production servers need maintenance, or they fail or a disaster recovery event is detected, the cluster 110 forwards all production requests to the recovery server 104. In exemplary aspects, the recovery server 104 may exist on a different cloud host/location than the production server 102. Thus when a disaster occurs or a maintenance need arises, the cluster 110 can redirect requests to the recovery server 104. In some aspects, the cluster 110 or external operators or users may test the failover/recovery procedures by issuing a failover test request 112 to the cluster 110, testing whether failover occurs properly to the recovery server 104.

Once the test occurs, however, there is no adequate way, without access credentials to production server 102, to determine whether the recovery server 104 has properly and successfully booted. For security and customer privacy purposes, a provider does not have access credentials (e.g., an operating system administrator password) to the production server 102. Because the recovery server 104 becomes a copy of the production server 102, the access credentials between the respective servers are shared. As a result, the provider cannot determine the status of the recovery server 104 because the provider does not possess access credentials for a customer's server(s). In order to determine the status of the recovery server 104, the provider would need to rely on manual and inefficient methods such as password trials on a login screen of the recovery server 104.

Thus, the system 100 includes a server status detector 130 that allows a provider to detect the boot status without access credentials to production server 102. The cluster 110 saves server parameters 108 over a period of time to the metric storage 120. The metric storage 120 may store, as server parameters 108, one or more of server login screen images, server networking activities snapshots, server disk activities snapshots, and/or server CPU activities snapshots. The server parameters 108 comprises raw data, which is then normalized and transformed into metrics by the metric storage 120. The server metrics on the storage 120 comprise a unique machine boot state identifier, parameter type, parameter value, and machine boot state.

In exemplary aspects, server status detector 130 comprises a metrics API 132, a recovery point (RP) validation module 134, a machine learning (ML) module 136 and an alert module 138. The server status detector 130 may use the metrics API 132 to access an interface of the metric storage 120. The server status detector 130 invokes the ML module 136 to evaluate the server metrics stored in the metric storage 120 over time, and attempts to extract boot status of the associated servers by applying the server metrics to a machine learning model. The model uses probability to determine whether the server metrics indicate a successful, unsuccessful or undetermined boot status. In exemplary aspects, the server status detector 130 receives a request to determine boot status of a particular server such as the recovery server 104 based on the server parameters 108. The ML module 136 compares the received parameters and compares the parameters to previously received parameters whose boot status has been previously determined/predicted or corrected.

The ML module 136 may specifically compare the parameters and determine how closely matched the respective parameters are and if they are above a certain similarity threshold, the ML module 136 can return a boot status determined for the previously analyzed parameters. In exemplary aspects, the boot status may be detected or undetected. In other words, if there is enough data to determine the boot status, it can be detected, but otherwise may be undetected. If the boot status is undetected, the server status detector 130 may indicate to an administrator to review the boot status of the recovery server 104 manually and enter the boot status manually. The server status detector 130 then retrains the machine learning model using the ML module 136.

When the ML module 136 is able to detect the boot status, the boot status of the recovery server 104 may be successful or unsuccessful. If the boot status is successful, the server status detector 130 marks a recovery point for the recovery server 104 as validated using the RP validation module 134, and in some aspects may submit a report to an administrator or to the cluster 110 accordingly. However, if the boot status of the recovery server 104 is unsuccessful, the RP validation module 134 marks the recovery point of the recovery server 104 as invalid.

In exemplary aspects, the server status detector 130 may invoke the alert module 138 to raise an alert in case the boot status of the server 104 indicates it was unsuccessfully booted. The alert may include one or more of a text message, a visual or audio indicator, an email, a phone call, a beeper signal or any method of notifying an operator or administrator of the cloud platform. In other aspects, the alert is generated in an electronic manner so the cloud platform can automatically detect the boot failure.

Figure 2:
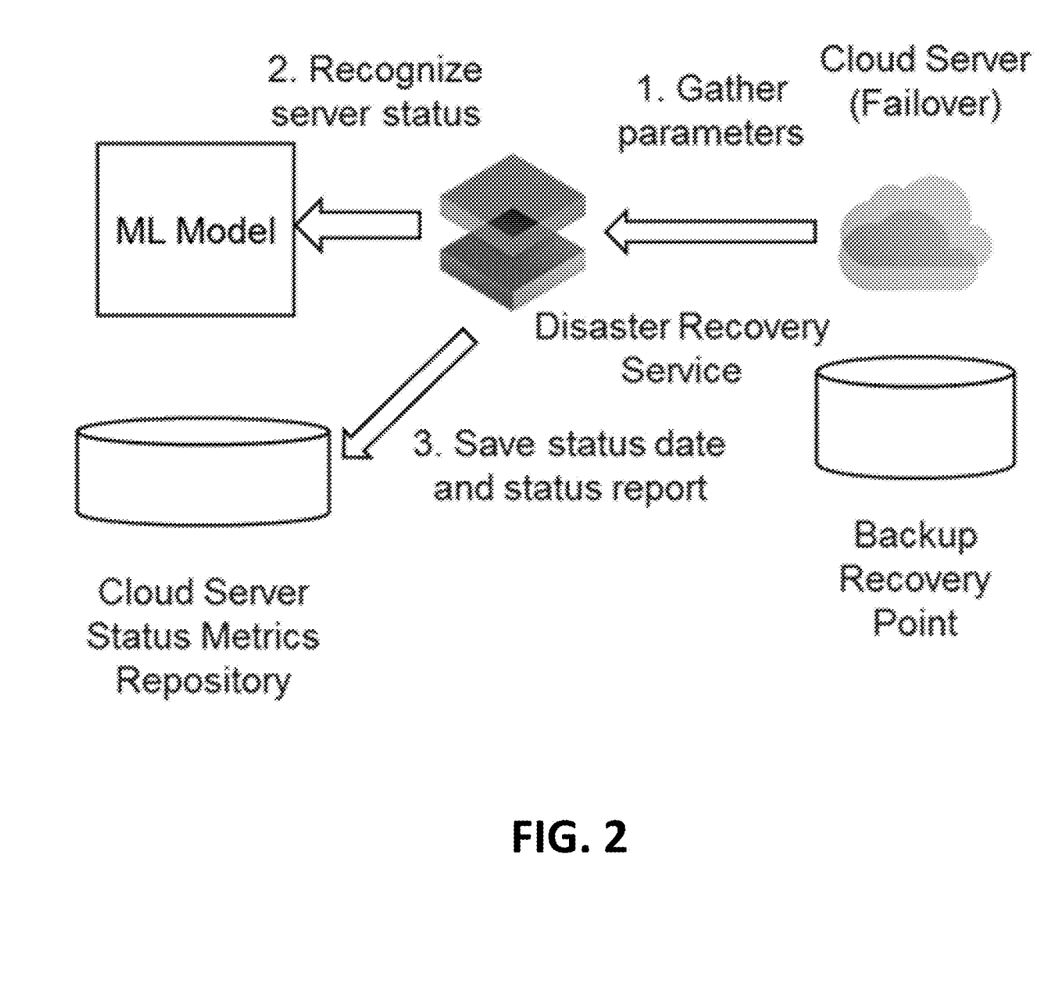
FIG. 2 is a sequence diagram illustrating the various steps to determine boot status of recovery servers, in accordance with exemplary aspects of the disclosure.

FIG. 2 is a sequence diagram illustrating the various steps to determine boot status of recovery servers, in accordance with exemplary aspects of the disclosure.

As indicated in FIG. 1, the first step in determining the boot status of recovery server 104 includes gathering parameters of the target server (the failover/recovery server whose status is sought). Server parameters associated with the production server 102 may be replicated at cluster 110 in time-based increments (e.g., 15 min, 30 min, etc.). At every increment, a separate recovery point that represents the state of the production server 102 is stored in the backup recovery point database depicted in FIG. 2. When a production failover or failover test is initiated by a customer or by an automatic testing procedure, a selection from the available recovery points in the backup recovery point can be made. Certain recovery points, however, will not allow the customer to recover services running on the production server 102 (e.g., due to operating system boot failure). A disaster recovery service, i.e., the server status detector 130, determines the server status using the ML module 136, which employs a machine learning model. In response to the ML module 136 outputting that the boot status of the recovery server 104 is successful, the RP validation module 134 determines that the selected recovery point used at recovery server 104 can successfully boot the recovery server 104. Based on this assessment, the RP validation module 134 marks the selected recovery point as valid. The server status detector 130 also saves the status date and a status report on the recovery server 104 in cloud server status and metrics repository, e.g., metric storage 120.

Figure 3:
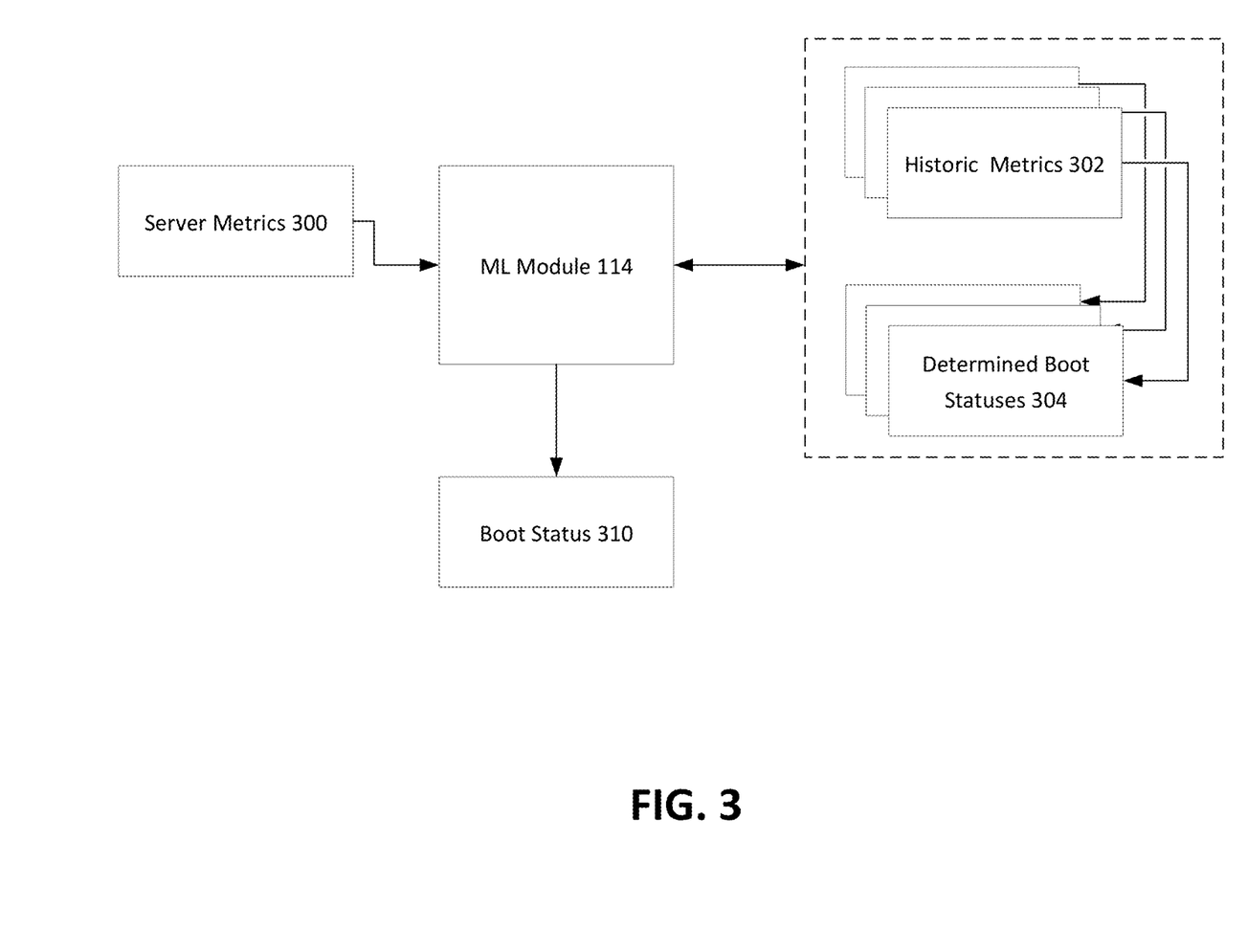
FIG. 3 is a block diagram of the machine learning module of the system in FIG. 1, in accordance with exemplary aspects of the disclosure.

FIG. 3 is a block diagram of the machine learning module 136 of the system in FIG. 1, in accordance with exemplary aspects of the disclosure.

The ML module 136 receives server metrics 300. The server metrics 300 are the analyzed (e.g., normalized and transformed) server parameters 108 of the recovery server 104. The server metrics 300 may comprise unique machine boot state identifier, parameter type, parameter value, and machine boot state. The machine boot state may be unknown until after the ML module 136 has applied the machine learning model to the parameter types/values.

The ML module 136 may use a machine learning model such as classification to determine, based on a set of metrics from server metrics 300, an output boot state. Each set of metrics may correspond to a known boot state. For example, server metrics 300 may provide a plurality of input data points that map an input metric such as a unique machine boot state identifier to respective known boot states such as "success," "failure," "in progress," and "unknown." The ML module 136 may use the plurality of input data points to train the classification ML model. Specifically, the ML module 136 generates weights which are imposed onto an input metric of the plurality of input data points to generate an output boot state. The output boot state is then compared to the known boot state associated with the input metric. Based on the error between the two values, the ML module 136 updates these weights. The determination of error and updates can be performed using, for example, gradient descent. It should be noted that several iterations of training may be performed by the ML module 136 until an adequate set of weights are determined (e.g., weights that lead to a low error rate).

The error rate may further be associated with a quantitative or qualitative value (e.g., a probability) of the ML module 136's confidence that the output boot state is indeed correct. For example, a training error rate of 79% would indicate that the probability of the output boot state being correct is 21%. The ML module 136 may determine that the probability is below a threshold probability (e.g., 90%) and request that a manual entry of boot status be entered for a given set of input metrics. In response to receiving the requested manual entry of boot status, the ML module 136 may retrain the machine learning model by, for example, updating the weights in accordance to the new input data point.

Figure 4:
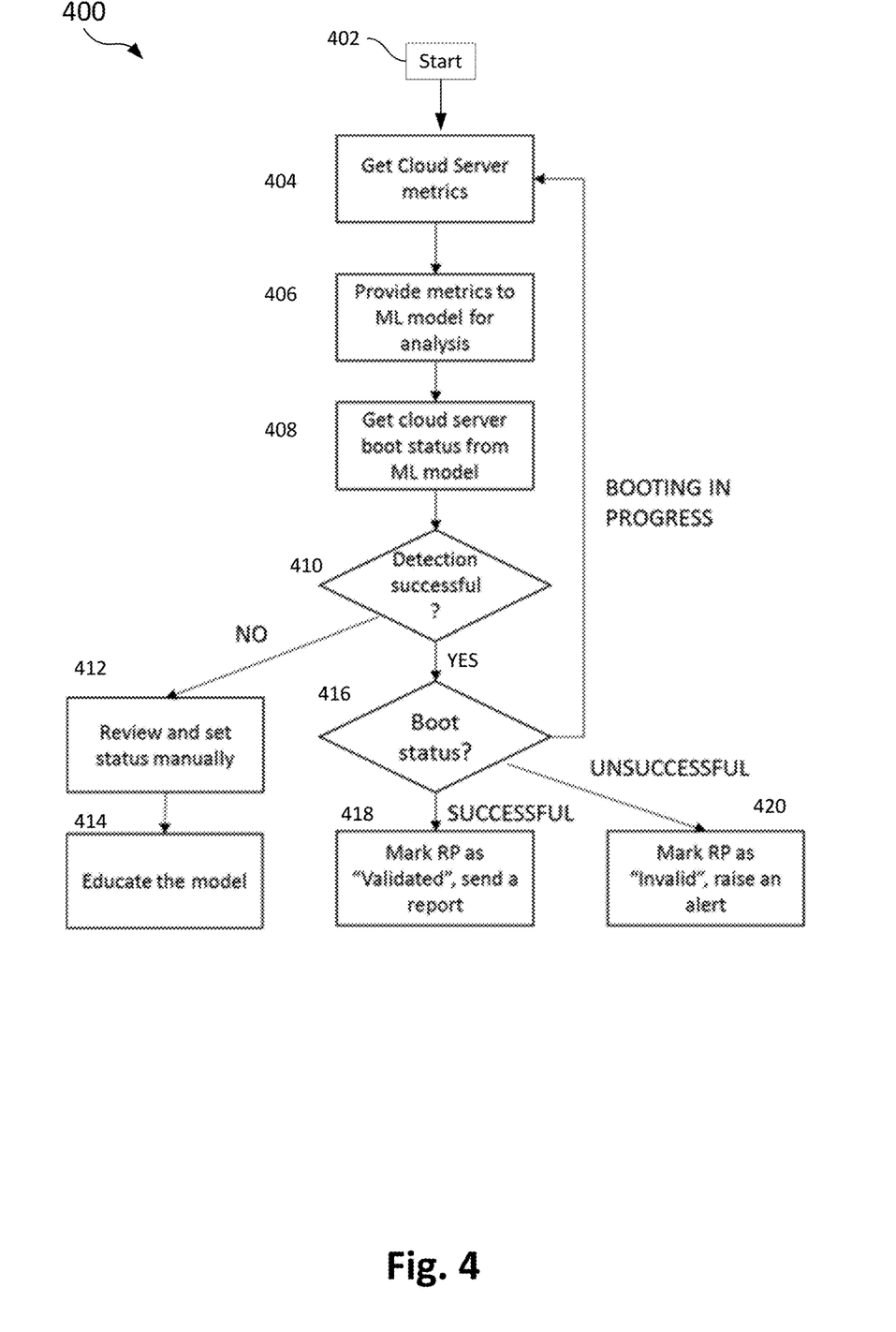
FIG. 4 is a flowchart illustrating a method of determining boot status of recovery servers, in accordance with exemplary aspects of the present disclosure.

FIG. 4 is a flowchart illustrating a method 400 of determining boot status of recovery servers, in accordance with exemplary aspects of the present disclosure.

The method begins at 402 and proceeds to 404.

At 404, the server status detector 130 retrieves server metrics for a failover server from a metric store, e.g. Metric storage 120. The metric storage 120 is a database that receives requests for storage of metric data and stores metric data periodically relating to one or more servers, e.g., servers hosted by a cloud platform or a like, though the present disclosure is not limited thereto. The metric storage may store one or more of cloud server login screen images, cloud server networking activities snapshots, cloud server disk activities snapshots, and/or cloud server CPU activities snapshots. The server metrics comprise a unique machine boot state identifier, parameter type, parameter value, and machine boot state. In exemplary aspects, the server status detector 130 may use the metrics API 132 to access an interface of the metric storage 120.

At 406, server status detector 130 uses the machine learning module 136 to apply a machine learning model to the server metrics for analysis. The analysis includes observing the data and recognizing various patterns in the server metrics.

At 408, the server status detector 130 detects a server boot status of the failover server based on the analysis of the machine learning model by the ML module 136. The boot status may be successfully detected, or it may be unsuccessfully detected based on whether there is enough data to make a determination. In one aspect, the method short circuits when the server status detector 130 determines that the metric data is less than a predetermined threshold in order to conserve resources. In other words, the server status detector 130 determines that the status cannot be successfully detected.

At 410, in response to determining that the server boot status was not successfully detected, the method proceeds to 412, where the server status detector 130 receives a server boot status entered manually from a user/operator and the server status detector 130 uses the ML module 136 to re-teach the machine learning model based on the operator determining setting. In this case, metrics that are received in the future will be able to be analyzed better to more accurately determine a boot status.

However, if at 410 the boot status is successfully detected, the method proceeds to 416. At 416, if the boot status indicates that the failover server was successfully booted (e.g., the boot status is "successful") based on the ML analysis of previous metric data and the received metric data, the method proceeds to 418. In exemplary aspects, the server status detector 130 applies the machine learning model by receiving parameters related to the server at a machine learning model and detecting the boot status of the server by applying the machine learning model according to a predetermined probability. For example, the predetermined probability may be a threshold value (e.g., 99%) that indicates whether a determined boot status is reliable. The predetermined probability may be adjusted (e.g., increased to 99.9%) to improve the accuracy of the ML module 136.

At 418, the RP validation module 134 marks a recovery point of the failover server as validated, otherwise the method proceeds to 420, and the RP validation module 134 marks the recovery point as invalid. In exemplary aspects, the server status detector 130 may invoke the alert module 138 to raise an alert. The alert may include one or more of a text message, a visual or audio indicator, an email, a phone call, a beeper signal or any method of notifying an operator or administrator of the cloud platform. In other aspects, the alert is generated in an electronic manner so the cloud platform can automatically detect the boot failure.

Figure 5:
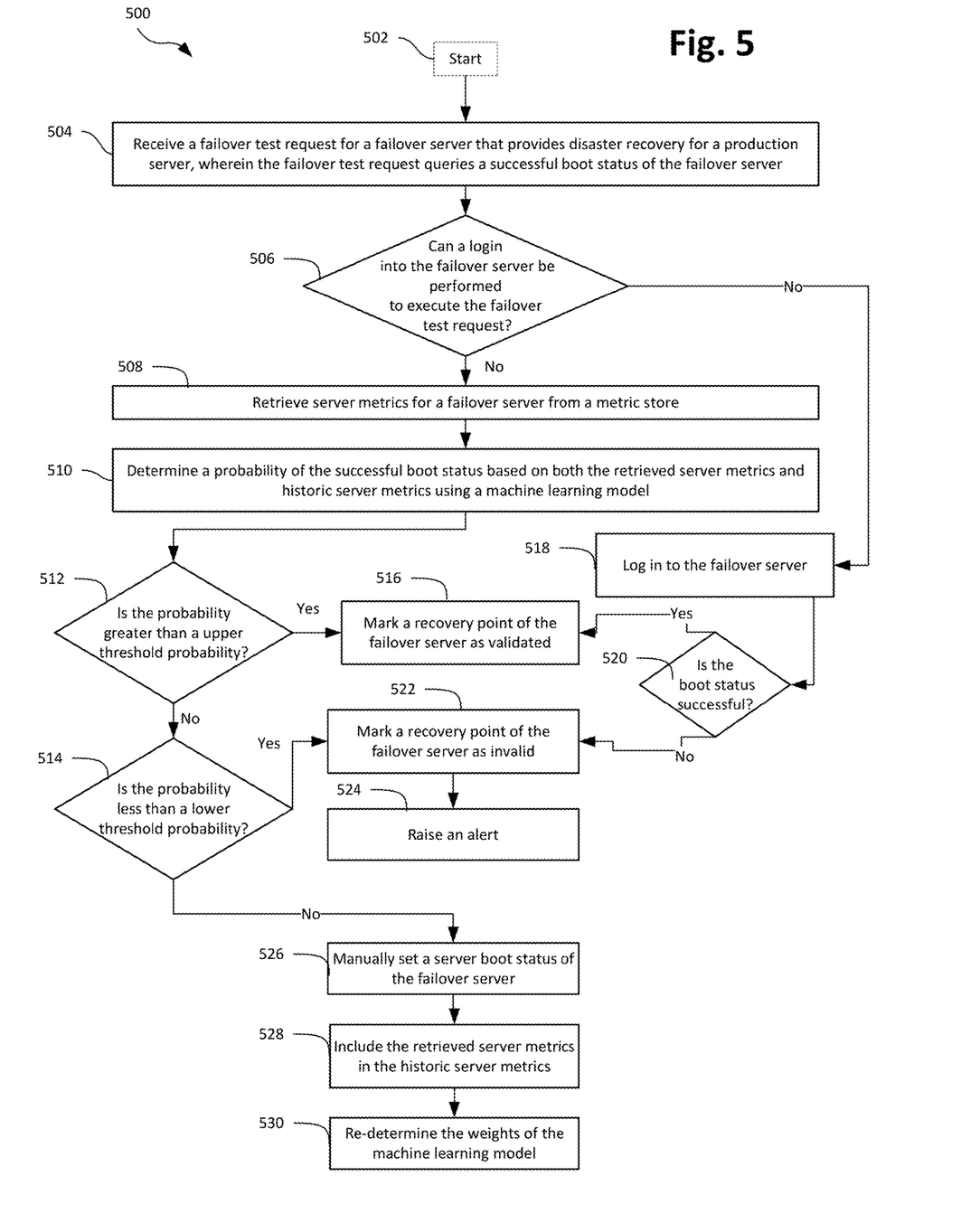
FIG. 5 is a flowchart illustrating a method of determining boot status of recovery servers based on probabilities, in accordance with exemplary aspects of the present disclosure.

FIG. 5 is a flowchart illustrating a method 500 of determining boot status of recovery servers, in accordance with exemplary aspects of the present disclosure.

The method begins at 502 and proceeds to 504. At 504, server status detector 130 receives a failover test request for a failover server that provides disaster recovery for a production server, wherein the failover test request queries a successful boot status of the failover server.

At 506, server status detector 130 determines whether a login into the failover server can be performed to execute the failover test request. For example, server status detector 130 may determine whether the failover server is password-protected with an unknown password. If the failover server is protected by an unknown password, the login cannot be performed and method 500 proceeds to 508. Otherwise, if the login can be performed (e.g., either the failover server is not password-protected or the password is known by server status detector 130), method 500 advances to 518, where server status detector 130 logs in to the failover server. Subsequently at 520, server status detector 130 determines whether the boot status is successful. In the event that the boot status is deemed successful, at 516, server status detector 130 marks a recovery point of the failover server as validated. If the boot status is not successful, at 522, server status detector 130 marks the recovery point of the failover server as invalid. From 522, method 500 advances to 524, where server status detector 130 raises an alert indicating that the failover server cannot be relied upon for disaster recovery.

In an exemplary aspect, a login cannot be performed into the failover server. Accordingly, from 506, method 500 advances to 508. At 508, server status detector 130 retrieves server metrics for a failover server from a metric store. The metric store stores one or more of cloud server login screen images, cloud server networking activities snapshots, cloud server disk activities snapshots, and cloud server CPU activities snapshots. The server metrics comprise a unique machine boot state identifier, parameter type, parameter value, and machine boot state.

At 510, server status detector 130 determines a probability of the successful boot status based on both the retrieved server metrics and historic server metrics. The probability may represent a correlation value between two data structures. The first data structure may represent the retrieved server metrics and the second data structure may represent the historic server metrics. In some aspects, there may be multiple data structures comprising different historic server metrics. Each data structure may be labelled with a boot status such as "successful," "failure, "inconclusive," etc. Server status detector 130 may determine a correlation value for each data structure relative to the first data structure. The probability is equated to the highest correlation value. For example, if the correlation values between the first data structure and three data structures each representing a successful boot status are 0.80, 0.55, and 0.78, the correlation value 0.8 is considered the probability of the successful boot status.

In some aspects, determining the probability comprises providing the input data structure of the server metrics to a machine learning model configured to apply weights to the input data structure to yield the probability of the successful boot status. The weights are determined by training the machine learning model based on (1) the historic server metrics and (2) an indication of whether the historic server metrics correspond to the successful boot status. ML module 114 may, for example, training the model may be by a dataset comprising labelled historic server metrics (e.g., "successful" and "non-successful"). The model may output a confidence score or a probability based on the weights that are generated during training.

At 512, server status detector 130 determines whether the probability (e.g., 80%) is greater than an upper threshold probability (e.g., 75%), wherein probabilities greater than the upper threshold probability are indicative of the successful boot status. If the probability is indeed greater than the upper threshold probability, method 500 proceeds to 516, where server status detector 130 marks a recovery point of the failover server as validated. This indicates that the failover test is a success.

If the probability (e.g., 13%) is not greater than the upper threshold probability, however, at 514, server status detector 130 determines whether the probability is less than a lower threshold probability (e.g., 25%), wherein probabilities less than the lower threshold probability are indicative of a failure boot status. If the probability is indeed less than the lower threshold probability, at 522, server status detector 130 marks a recovery point of the failover server as invalid and at 524, server status detector 130 raises an alert.

If the probability (e.g., 60%) is also not less than the lower threshold probability (i.e., the probability is not good enough to make a decision, method 500 proceeds to 526. At 526, server status detector 130 manually sets a server boot status of the failover server. For example, server status detector 130 may query the user of the production server to determine whether the failover server has successfully booted. The user may then provide the server boot status. Server status detector 130 may then include the retrieved server metrics in the historic server metrics at 528. At 530, ML module 114 re-determines the weights of the machine learning model.

Figure 6:
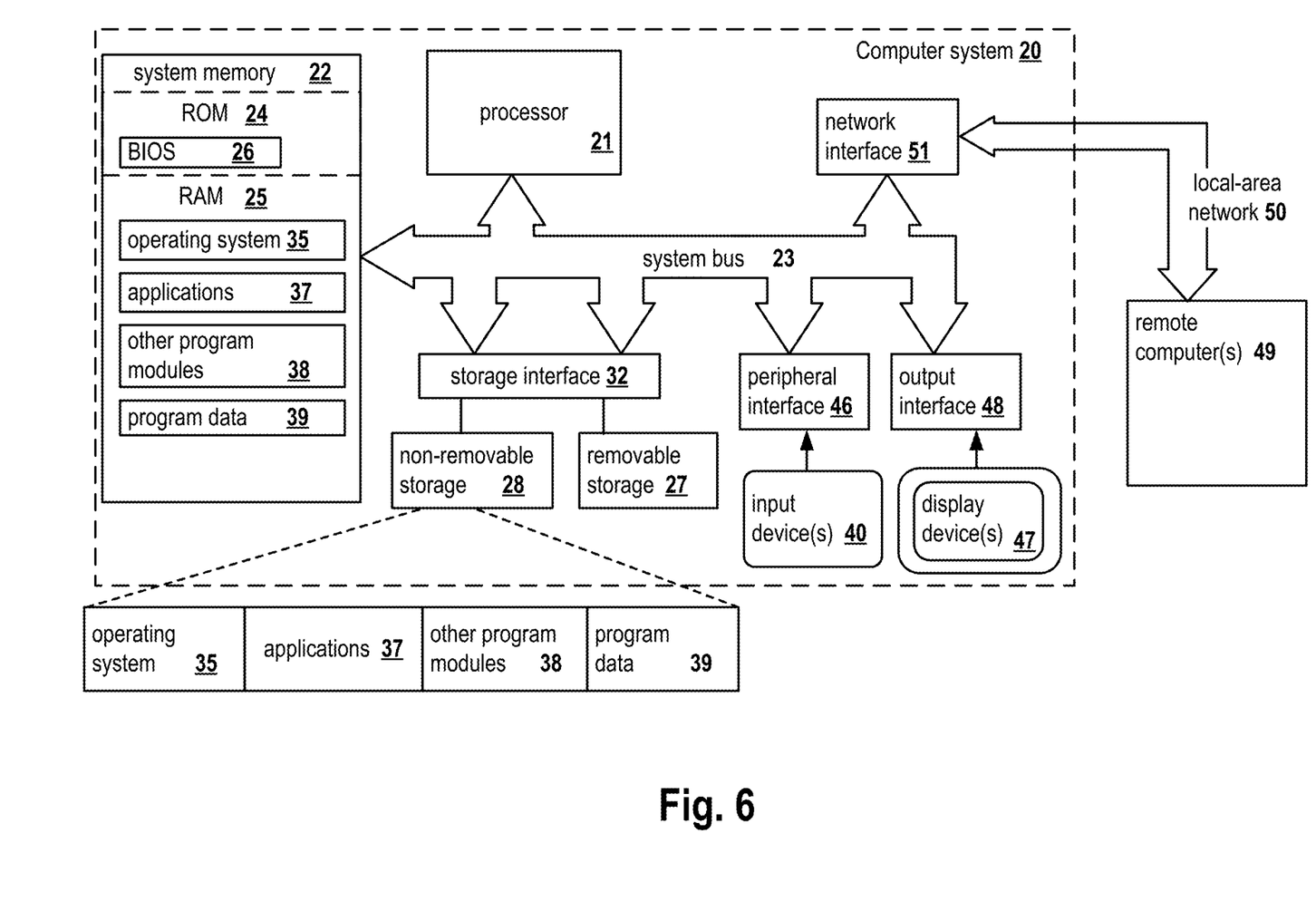
FIG. 6 is a block diagram of a computer system on which the disclosed system and method can be implemented according to an exemplary aspect.

FIG. 6 is a block diagram illustrating a computer system 20 on which aspects of systems and methods of determining boot status of recovery servers may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for determining boot status of recovery servers, the method comprising:
   receiving a failover test request for a failover server that provides disaster recovery for a production server, wherein the failover test request queries a successful boot status of the failover server:
   determining whether a login into the failover server can be performed to execute the failover test request;
   In response to determining that the login cannot be performed:
   retrieving server metrics for the failover server from a metric store;
   determining a probability of the successful boot status based on both the retrieved server metrics and historic server metrics; and
   in response to determining that the probability is greater than a threshold probability, marking a recovery point of the failover server as validated.

2. The method of claim 1, further comprising:
   In response to determining that the probability is not greater than the threshold probability, marking the recovery point as invalid and raising an alert.

3. The method of claim 1, wherein the server metrics are captured in an input data structure, and wherein determining the probability further comprises:
   providing the input data structure of the server metrics to a machine learning model configured to apply weights to the input data structure to yield the probability of the successful boot status,
   wherein the weights are determined by training the machine learning model based on (1) the historic server metrics and (2) an indication of whether the historic server metrics correspond to the successful boot status.

4. The method of claim 3, wherein the threshold probability is an upper threshold probability, further comprising:
   comparing the probability to both the upper threshold probability and a lower threshold probability, wherein probabilities greater than the upper threshold probability are indicative of the successful boot status and probabilities less than the lower threshold probability are indicative of a failure boot status; and
   in response to determining that the probability is not greater than the upper threshold probability and is not less than the lower threshold probability:
   manually setting a server boot status of the failover server;
   including the retrieved server metrics in the historic server metrics; and re-determining the weights of the machine learning model.

5. The method of claim 1, wherein the metrics store stores one or more of cloud server login screen images, cloud server networking activities snapshots, cloud server disk activities snapshots, and cloud server CPU activities snapshots.

6. The method of claim 1, wherein the server metrics comprise a unique machine boot state identifier, parameter type, parameter value, and machine boot state.

7. The method of claim 1, wherein determining that the login into the failover server cannot be performed to execute the failover test request further comprises determining that the failover server is password-protected with an unknown password.

8. A system of determining boot status of recovery servers, the system comprising:
a hardware processor configured to:
receive a failover test request for a failover server that provides disaster recovery for a production server, wherein the failover test request queries a successful boot status of the failover server;
determine whether a login into the failover server can be performed to execute the failover test request;
in response to determining that the login cannot be performed:
retrieve server metrics for the failover server from a metric store;
determine a probability of the successful boot status based on both the retrieved server metrics and historic server metrics; and
in response to determining that the probability is greater than a threshold probability, mark a recovery point of the failover server as validated.

9. The system of claim 8, wherein the hardware processor is further configured to in response to determining that the probability is not greater than the threshold probability, mark the recovery point as invalid and raise an alert.

10. The system of claim 8, wherein the server metrics are captured in an input data structure, and wherein the hardware processor is configured to determine the probability by:
providing the input data structure of the server metrics to a machine learning model configured to apply weights to the input data structure to yield the probability of the successful boot status,
wherein the weights are determined by training the machine learning model based on (1) the historic server metrics and (2) an indication of whether the historic server metrics correspond to the successful boot status.

11. The system of claim 10, wherein the threshold probability is an upper threshold probability, wherein the hardware processor is further configured to:
compare the probability to both the upper threshold probability and a lower threshold probability, wherein probabilities greater than the upper threshold probability are indicative of the successful boot status and probabilities less than the lower threshold probability are indicative of a failure boot status; and
in response to determining that the probability is not greater than the upper threshold probability and is not less than the lower threshold probability:
manually set a server boot status of the failover server;
include the retrieved server metrics in the historic server metrics; and
re-determine the weights of the machine learning model.

12. The system of claim 8, wherein the metrics store stores one or more of cloud server login screen images, cloud server networking activities snapshots, cloud server disk activities snapshots, and cloud server CPU activities snapshots.

13. The system of claim 8, wherein the server metrics comprise a unique machine boot state identifier, parameter type, parameter value, and machine boot state.

14. The system of claim 8, wherein the hardware processor is further configured to determine that the login into the failover server cannot be performed to execute the failover test request further comprises determining that the failover server is password-protected with an unknown password.

15. A non-transitory computer readable medium storing thereon computer executable instructions for determining boot status of recovery servers, including instructions for:
receiving a failover test request for a failover server that provides disaster recovery for a production server, wherein the failover test request queries a successful hoot status of the failover server;
determining whether a login into the failover server can be performed to execute the failover test request;
in response to determining that the login cannot be performed:
retrieving server metrics for the failover server from a metric store;
determining a probability of the successful boot status based on both the retrieved server metrics and historic server metrics; and
in response to determining that the probability is greater than a threshold probability, marking a recovery point of the failover server as validated.

16. The non-transitory computer readable medium of claim 15, further comprising instructions for:
In response to determining that the probability is not greater than the threshold probability, marking the recovery point as invalid and raising an alert.

17. The non-transitory computer readable medium of claim 15, wherein the server metrics are captured in an input data structure, and wherein an instruction for determining the probability further comprises instructions for:
providing the input data structure of the server metrics to a machine learning model configured to apply weights to the input data structure to yield the probability of the successful boot status,
wherein the weights are determined by training the machine learning model based on (1) the historic server metrics and (2) an indication of whether the historic server metrics correspond to the successful boot status.

18. The non-transitory computer readable medium of claim 17, wherein the threshold probability is an upper threshold probability, further comprising instructions for:
comparing the probability to both the upper threshold probability and a lower threshold probability, wherein probabilities greater than the upper threshold probability are indicative of the successful boot status and probabilities less than the lower threshold probability are indicative of a failure boot status; and
in response to determining that the probability is not greater than the upper threshold probability and is not less than the lower threshold probability:
manually setting a server boot status of the failover server;
including the retrieved server metrics in the historic server metrics; and
re-determining the weights of the machine learning model.

19. The non-transitory computer readable medium of claim 15, wherein the metrics store stores one or more of cloud server login screen images, cloud server networking activities snapshots, cloud server disk activities snapshots, and cloud server CPU activities snapshots.

20. The non-transitory computer readable medium of claim 15, wherein the server metrics comprise a unique machine boot state identifier, parameter type, parameter value, and machine boot state.

* * * * *